G. W. OWENS.
PACKING RING.
APPLICATION FILED JUNE 21, 1913.
1,106,054.
Patented Aug. 4, 1914.
3 SHEETS—SHEET 1.
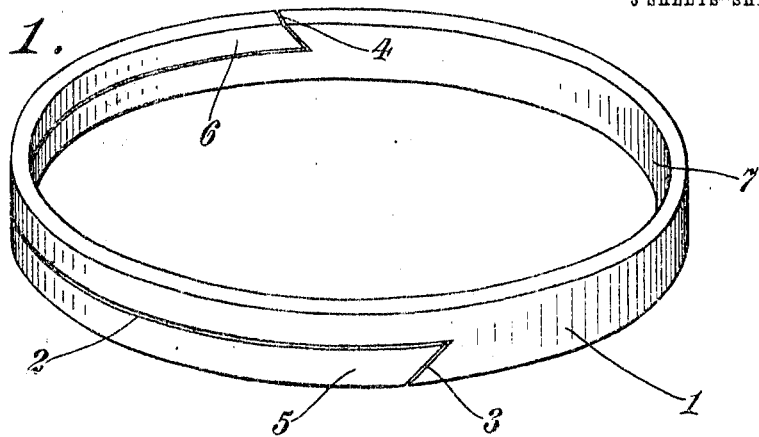
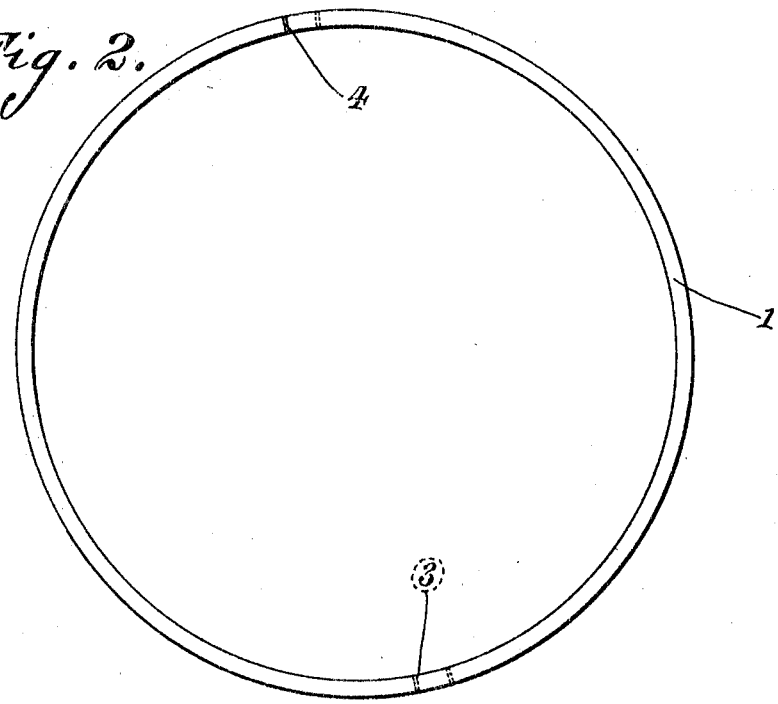
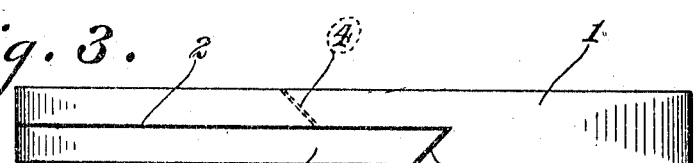
Witnesses:
George G. Anderson.
Harry H. Russ.
Inventor:
George W. Owens.
By Hugh K. Wagner
His Attorney.

G. W. OWENS.
PACKING RING.
APPLICATION FILED JUNE 21, 1913.

1,106,054.

Patented Aug. 4, 1914.
3 SHEETS—SHEET 2.

Witnesses:
George G. Anderson.
Harry H. Reiss.

Inventor:
George W. Owens,
By Hugh K. Wagner
His Attorney.

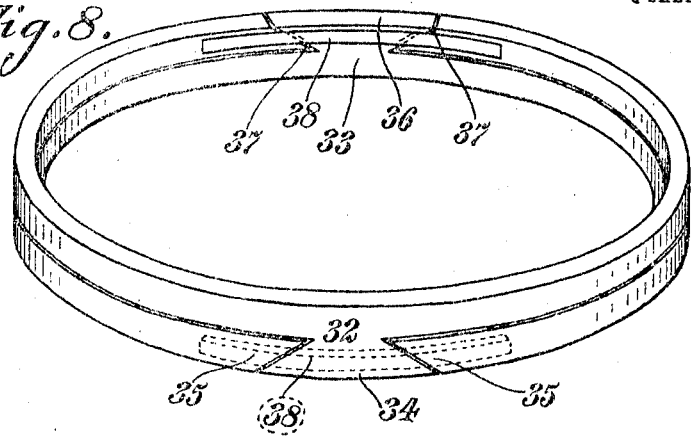
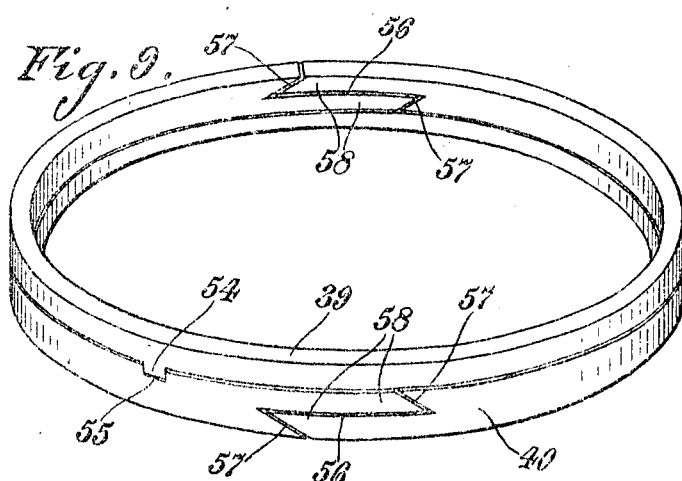
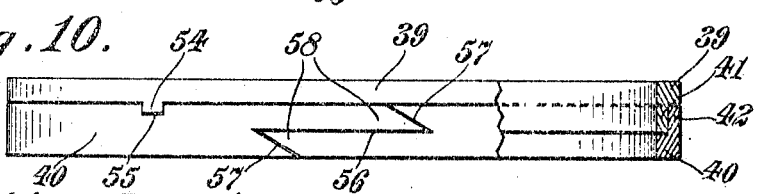
 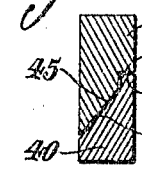 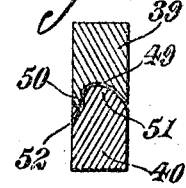 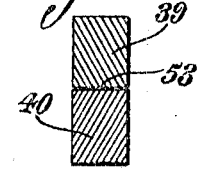

UNITED STATES PATENT OFFICE.

GEORGE W. OWENS, OF ST. LOUIS, MISSOURI.

PACKING-RING.

1,106,054.

Specification of Letters Patent.  Patented Aug. 4, 1914.

Application filed June 21, 1913. Serial No. 774,945.

*To all whom it may concern:*

Be it known that I, GEORGE W. OWENS, a citizen of the United States, residing at the city of St. Louis, State of Missouri, have invented certain new and useful Improvements in Packing-Rings, of which the following is a specification, reference being had therein to the accompanying drawings.

This invention relates to certain new and useful improvements in packing rings and relates more particularly to packing rings adapted for use on pistons, and the object of the invention is to provide a packing ring of novel, improved and economical construction, which is permitted to freely expand for the purpose of making intimate contact with the cylinder.

Figure 4:
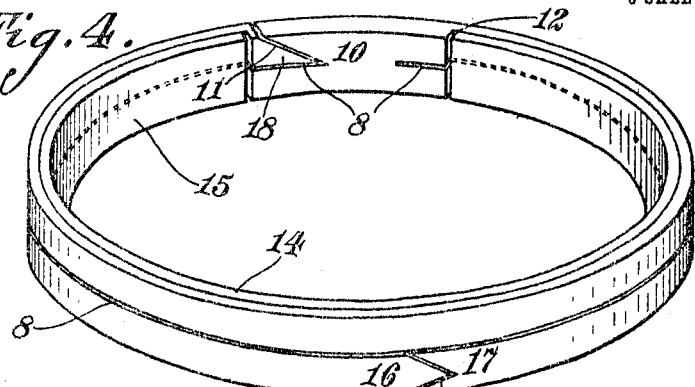
Figure 5:
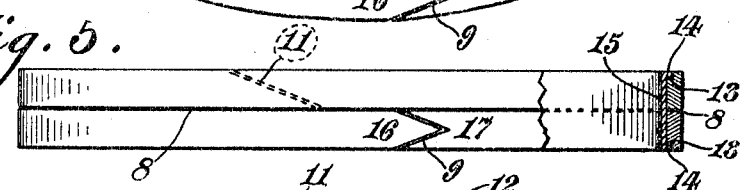
Figure 6:
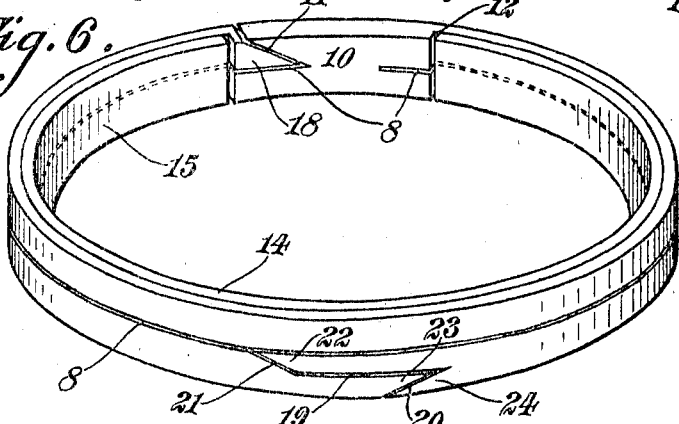
Figure 7:
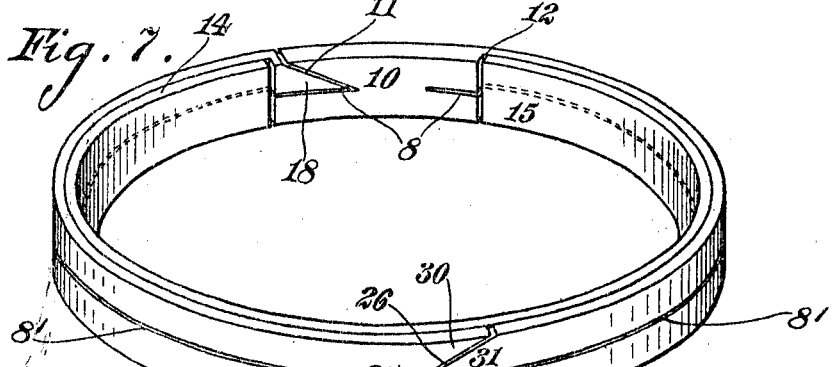

In the drawings: Figure 1 is a perspective view of the preferred form of the invention; Fig. 2 is a top plan view; Fig. 3 is a side elevation; Fig. 4 is a perspective view of a modified form of the invention; Fig. 5 is a side elevation, partly broken away, and in section; Fig. 6 is a perspective view of a further modified form of the invention; Fig. 7 is a perspective view of a still further modified form of the invention; Fig. 8 is a perspective view of another modified form of the invention; Fig. 9 is a perspective view of a still further modified form of the invention; Fig. 10 is a side elevation, partly broken away and in section of Fig. 9; and Figs. 11, 12, 13, and 14 are cross-sectional views of four alternate forms of the rings shown in Figs. 9 and 10.

In the form of the invention depicted in Figs. 1 to 3 of the drawings, the ring 1 is formed of a steel band which has an arcual cut 2 preferably located centrally between the side edges of the ring, which cut may be greater or less than a semi-circle. One end of the cut 2 terminates at the inner end of an inclined cut 3 which latter extends through one of the side edges of the ring, while the opposite end of the cut 2 terminates at the inner end of an inclined cut 4, the latter, however, extending through the side edge of the ring opposite to that through which the inclined cut 3 extends, and also, being inclined in the opposite direction from the inclination of the cut 3, as depicted in Figs. 1 and 3 of the drawings.

From the above it will be seen that the ring has a pair of freely movable and oppositely disposed end parts 5 and 6 which can move to contact with the cylinder, and which being located adjacent the respective side edges of the ring, insure a more perfect joint between the piston and cylinder. Further, by locating the extremities of the parts 5 and 6 at points diametrically opposite to each other, the said parts are thus permitted to freely engage the cylinder at widely separated points, which assures a more perfect joint, and in addition a large major portion 7 is provided on the ring, which acts to more effectively connect the parts.

In Figs. 4 and 5 of the drawings, the ring is provided with a cut 8 which extends nearly entirely around the band. On one side of the cut 8, the ring is formed with a substantially V-shaped cut 9, that is located opposite to the uncut portion 10. The ring on the other side of the cut 8 is formed with an inclined cut 11 which extends inwardly to the cut 8. The inner circumference of the ring is formed with a cut-away portion 12 and each of the inner side edges of the ring is provided with cut-away portions 13 to receive the lateral flanges 14 formed on an arcuate spring 15 which latter is employed to expand the ring against the cylinder.

With use of the structure depicted in Figs. 4 and 5 it will be seen that the ring has three freely movable parts 16, 17 and 18 which conformably engage the cylinder, the spring acting to cover the slot 8 and thereby prevent leakage of steam therepast and through the cut 9.

In the form of the invention depicted in Fig. 6, the ring has the cut 8, the uncut part 10, the cut 11, the spring 15, and the cut-away parts 12 and 13 which receive the spring 15 and the flanges 14 thereof, all as described in connection with the form of the invention shown in Figs. 4 and 5. In Fig. 6, however, the side of the ring opposite to the side that has the inclined cut 11 is formed with a comparatively short cut 19 which extends substantially parallel to the cut 8 and which has oppositely inclined cuts 20 and 21 extending from its ends through the side edge of the ring and into the cut 8 respectively, to provide three freely movable and separated portions 22, 23 and 24, which can move to engage with the cylinder and which with the part 18 provide the ring with four freely movable parts, instead of the three freely movable parts shown in Figs. 4 and 5. In each of the forms shown in Figs. 4, 5 and 6, the spring acts to force the said freely movable parts outwardly against the cylinder.

In Fig. 7 of the drawings, the ring is identical with that described in connection with Figs. 4, 5 and 6, with the exception that there are two cuts 8' which extend from the ends of part 10 to the ends of a part 25 which latter is located substantially diametrically opposite to the part 10, the ring being formed with inclined cuts 26 and 27, which extend from the ends of the part 25 in opposite directions from the latter so that cut 26 extends through one side edge of the ring and cut 27 extends through the opposite side edge of the ring, thus providing four freely movable parts 28, 29, 30 and 31, which together with the part 18 provide the ring with five freely movable parts.

Referring to the form of the invention shown in Fig. 8 of the drawings, it will be seen that the ring is composed of two members 32 and 33 each in the form of an incomplete circle. The member 32 has a head 34 which extends outwardly from its inner side, the sides of the head being inclined and converging inwardly, while the free ends 35 of the member 33 are inclined so as to engage and interlock with the head 34. Similarly, the member 33 has a head 36 the sides of which are inclined and converge inwardly and interlock with the inclined free ends 37 of the member 32.

It will be apparent from inspection of Fig. 8 of the drawings, that the heads 34 and 36 extend in opposite directions and are located at points diametrically opposite to each other, whereby the four ends of the members provide as many freely movable parts which can move to engage with the cylinder. In order to effect outward movement of the ends of the members, flat springs 38 may be inset or secured to the heads 34 and 36, so that the free ends of the springs bear against the respective free ends of the members to move the said free ends outwardly against the cylinder. From the above it will be readily apparent that the free ends of one member interlock with the head of the other member, whereby the head 36 of member 33 holds the free ends 37 of the member 32 against lateral movement, and the head 34 of the member 32 holds the free ends 35 of the member 33 against lateral movement.

In Figs. 9 and 10 of the drawings, a packing ring is shown which consists of a pair of members 39 and 40, the member 39 being cutaway on its periphery to form a tongue 41 while the member 40 is cutaway on its inner circumference to form a tongue 42 which engages the tongue 41 whereby an overlapping joint is formed between the two members. If desired, the member 39 may be formed with a tongue that has an inclined inner face 43 which engages the beveled edge 44 of the member 40, as shown in Fig. 11 of the drawings, or as illustrated in Fig. 12, the member 39 may be formed with a larger tongue 45 which has an inclined inner face and terminates in a cut-out part 46. The member 40 in Fig. 12 has a beveled edge 47 which engages the inclined face of tongue 45, and a tongue which projects into the cut-out part 46. In Fig. 13, the member 39 is formed with a concave groove 49 and a tongue 50, while the member 40 has a convex tongue 51 which projects into the concave groove 49 and a cut-out part 52 which receives the tongue 50 of member 39. A still further form of joint between the members 39 and 40 may be a straight one, such as is depicted at 53 in Fig. 14.

In order to hold the two members 39 and 40 in their relative assembled position, against sliding movements, the member 39 is formed with a projection 54 which fits in a notch 55 formed in the member 40, as shown in Fig. 9.

Each of the members 39 and 40 is formed with a cut 56 located between the side edges of the respective members. Inclined cuts 57 extend from the ends of each of the cuts 56 through the inner and outer sides of the respective members thereby providing each ring with four freely movable parts or ends 58.

In the forms of the invention depicted in Figs. 9 to 14, inclusive, no springs are employed.

What is claimed is:

1. A packing ring having an arcual cut extending substantially midway of the width and approximately parallel to the side edges of the ring and having its ends terminating at points substantially diametrically opposite to each other and further having oppositely disposed inclined cuts which lead from the opposite side edges of the ring to the respective ends of the arcual cut, whereby the ring is provided with a pair of freely movable parts which have their free ends located at points in substantially diametrically opposed relation to each other.

2. A packing ring having an arcual cut which extends throughout the major circumference thereof and having an inclined cut which leads from one side edge of the ring into one end of the arcual cut to provide a freely movable part, the opposite side edge of the ring having a V-shaped cut which has one end extending through the edge of the opposite side of the ring and has its other end extending through the said arcual cut at approximately the center of the arc of the latter to provide a pair of freely movable parts which have interengaging free ends.

3. A packing ring having an arcual cut which extends throughout the major circumference thereof and having an inclined cut which leads from one side of the ring into one end of the arcual cut to provide a freely movable part, the opposite side of the ring having a short arcual cut parallel to the main arcual cut and also having oppositely disposed inclined cuts which lead from the ends of the short arcual cut into the main cut and through the edge of said opposite side of the ring to provide three freely movable parts on one side of the main arcual cut, and a spring on the interior of the ring secured to the latter.

4. A packing ring having a pair of arcual cuts which have their adjacent ends spaced apart to form a pair of diametrically opposed connecting portions, one side of the ring having an inclined cut which leads into one end of one arcual cut and also having a second inclined cut which leads into the opposite end of the other arcual cut, the other side of the ring having an inclined cut which leads into the other end of the first named arcual cut, and a spring on the interior of the ring.

5. A packing ring composed of a pair of members each in the form of an incomplete circle having their free ends inclined, each member having a central head on one side thereof which heads extend in opposite directions from each other and have inclined sides to interlockingly engage the inclined ends of the other member.

6. A packing ring composed of a pair of members each in the form of an incomplete circle having their free ends inclined, each member having a central head on one side thereof which heads extend in opposite directions from each other and have inclined sides to interlockingly engage the inclined ends of the other member, and means on each head to engage the free ends of the other member to move said free ends outwardly.

7. A packing ring composed of a pair of members, one member having a notch on one side and the other member having a projection which engages in said notch, to prevent sliding movements between said members, each of the members having a short arcual cut and also having inclined cuts extending from the ends of the arcual cut through opposite sides of the said member, the arcual cut of one member being located diametrically opposite to the arcual cut of the other member.

8. A packing ring composed of a pair of members each in the form of an incomplete circle, each member having a central head on one side thereof which heads extend in opposite directions from each other, the free ends of one member being disposed on opposite sides of the head of the other member.

9. In a packing ring having freely movable parts, a spring disposed on the interior of the ring and having outwardly extending flanges at its opposite sides, which flanges are received in cut-away portions provided therefor on the inner side edges of the ring.

10. A packing ring having a main arcual cut which divides same into two side portions, one of the side portions having a cut which leads into one end of the main arcual cut to provide a freely movable part, the other side portion having a cut between the ends of the arcual cut which divides same into a pair of freely movable parts.

In testimony whereof I hereunto affix my signature in the presence of two witnesses.

GEORGE W. OWENS.

Witnesses:
GEORGE G. ANDERSON,
HARRY H. REISS.